United States Patent
Yang et al.

(10) Patent No.: US 11,512,253 B2
(45) Date of Patent: Nov. 29, 2022

(54) FABRICATION METHOD OF INP BASED QUANTUM DOT BY USING AMINOPHOSPHINE TYPE P PRECURSOR AND CORE SIZE-SORTING PROCEDURE

(71) Applicant: Hongik University Industry-Academia Cooperation Foundation, Seoul (KR)

(72) Inventors: Hee-Sun Yang, Seoul (KR); Jung-Ho Jo, Seoul (KR)

(73) Assignee: Hongik University Industry-Academia Cooperation Foundation, Seoul (KR)

(*) Notice: Subject to any disclaimer, the term of this patent is extended or adjusted under 35 U.S.C. 154(b) by 512 days.

(21) Appl. No.: 16/668,634

(22) Filed: Oct. 30, 2019

(65) Prior Publication Data
US 2020/0362241 A1 Nov. 19, 2020

(30) Foreign Application Priority Data
May 16, 2019 (KR) .................. 10-2019-0057626

(51) Int. Cl.
| | |
|---|---|
| B82Y 40/00 | (2011.01) |
| C09K 11/88 | (2006.01) |
| C09K 11/08 | (2006.01) |
| B01J 13/04 | (2006.01) |
| C23C 18/12 | (2006.01) |
| B82Y 20/00 | (2011.01) |

(52) U.S. Cl.
CPC ............ C09K 11/883 (2013.01); B01J 13/04 (2013.01); C09K 11/0883 (2013.01); C23C 18/1204 (2013.01); B82Y 20/00 (2013.01); B82Y 40/00 (2013.01)

(58) Field of Classification Search
CPC ... C09K 11/883; C09K 11/0883; C09K 11/70; C09K 11/565; B01J 13/04; B01J 13/06; B01J 13/22; C23C 18/1204; B82Y 20/00; B82Y 40/00
See application file for complete search history.

(56) References Cited

U.S. PATENT DOCUMENTS

2019/0315623 A1* 10/2019 Moriyama ............ C09K 11/70

FOREIGN PATENT DOCUMENTS

| KR | 10-10881080000 B1 | 11/2011 |
| KR | 10-2014-0117204 A | 10/2014 |
| KR | 10-2018-0016196 A | 2/2018 |
| KR | 10-2019-0026211 A | 3/2019 |

OTHER PUBLICATIONS

Byu et al ("Solvothermal synthesis of InP quantum dots and their enhanced luminescent efficiency by post-synthetic treatments"; Journal of Colloid and Interface Science, Dec. 2010 (Year: 2010).*
Byun, Ho-June, Solvothermal synthesis of InP quaantum doots and their enhanced luminescent efficiency by post-synthetic treatments, Journal of Colloid and Interface Science, pp. 35-41 (Year: 2011).*
Altintas, Y., et al., "Highly Efficient Cd-Free Alloyed Core/Shell Quantum Dots with Optimized Precursor Concentrations", The Journal of Physical Chemistry C 2016, pp. 7885-7892, vol. 120.
Li, L. and Reiss, P., "One-pot Synthesis of Highly Luminescent InP/ZnS Nanocrystals without Precursor Injection" J. Am. Chem. Soc. 2008, pp. 11588-11589, vol. 9.
Park, J.P., et al., "Highly luminescent InP/GaP/ZnS QDs emitting in the entire color range via a heating up process", Scientific Reports 2016, pp. 1-6, vol. 30094, DOI: 10.1038/srep/30094.
Pietra, F., et al., "Tuning the Lattice Parameter of InxZnyP for Highly Luminescent Lattice-Matched Core/Shell Quantum Dots", ACS Nano 2016, pp. 4754-4762, vol. 10.
Pietra, F., et al., "Ga for Zn Cation Exchange Allows for Highly Luminescent and Photostable InZnP-Based Quantum Dots", Chemistry of Materials 2017, pp. 5192-5199, vol. 29.
Ramasamy, P., et al., "Tunable, Bright, and Narrow-Band Luminescence from Colloidal Indium Phosphide Quantum Dots", Chemistry of Materials 2017, pp. 6893-6899, vol. 29.
Ramasamy, P., et al., "Two-Step "Seed-Mediated" Synthetic Approach to Colloidal Indium Phosphide Quantum Dots with High-Purity Photo- and Electroluminescence", Chemistry of Materials 2018, pp. 3643-3647, vol. 30.
Song, W., et al., "Amine-derived synthetic approach to color-tunable InP/ZnS quantum dots with high fluorescent qualities", J. Nanopart. Res. 2013, pp. 1-10, vol. 15, DOI: 10.1007/s11051-013-1750y.
Tessier, M.D., et al., "Economic and Size-Tunable Synthesis of InP/ZnE (E=S, Se) Colloidal Quantum Dots", Chemistry of Materials 2015, pp. 4893-4898, vol. 27.
Ho-June Byun et al., "Solvothermal synthesis of InP quantum dots and their enhanced luminescent efficiency by post-synthetic treatments", Journal of Colloid and Interface Science 355 (2011) 35-41.

* cited by examiner

Primary Examiner — Donald L Raleigh
(74) Attorney, Agent, or Firm — Wolter Van Dyke Davis, PLLC; Eugene J. Molinelli; Martha Cassidy (57) ABSTRACT

A method for fabricating quantum dots according to the present disclosure includes (a) synthesizing InP cores based on an aminophosphine type phosphorus (P) precursor, (b) size-sorting the InP cores, and (c) forming at least two shells on the size-sorted InP cores. In this instance, the size-sorting includes precipitating the InP cores with an addition of a dispersive solvent and a nondispersive solvent to the InP cores and separating the InP cores using a centrifugal separator, wherein the InP cores are separated in a descending order by size by performing iteration with a gradual increase in an amount of the nondispersive solvent.

7 Claims, 9 Drawing Sheets

FABRICATION METHOD OF INP BASED QUANTUM DOT BY USING AMINOPHOSPHINE TYPE P PRECURSOR AND CORE SIZE-SORTING PROCEDURE

TECHNICAL FIELD

The present disclosure relates to a method for fabricating InP quantum dots of non-Cd composition, and more particularly, to a method for fabricating InP quantum dots using an aminophosphine type phosphorus precursor.

The present application claims the benefit of Korean Patent Application No. 10-2019-0057626 filed on May 16, 2019 with the Korean Intellectual Property Office, the disclosure of which is incorporated herein by reference in its entirety.

BACKGROUND ART

A colloidal semiconductor nanocrystal called a quantum dot (QD) emits light as an electron in an unstable state moves from the conduction band to the valence band, and as QDs are smaller in size, they emit shorter wavelength light. This is unique electrical and optical properties that are different from those of the existing semiconductor material, and QDs are easy to modify the fluorescent emission wavelength through size adjustment or alloying/doping introduction. In addition, with the continuous development of synthesis methods, fluorescent emission of QDs is satisfactorily efficient in terms of practical device applications. Thus, QDs are regarded as an active material that can replace rare earth element-doped bulk phosphor and fluorescent/phosphorescent polymer in the manufacture of LEDs.

II-VI based compound semiconductor QDs have been gaining much attention due to their high quantum yield of 60% or more and optical and chemical stability. A typical example of II-VI based compound semiconductor QDs is CdSe, and due to high quantum yield and stability characteristics, CdSe attracts attention and has been much studied. However, such QDs are harmful to humans and environment because they contain a toxic substance such as $Cd^{2+}$.

Accordingly, recently, there is great interest in QDs of non-Cd composition free of toxic substance as an alternative to highly toxic II-VI based compound semiconductor QDs. In this context, III-V based binary compound semiconductor QDs have been much studied. Among the III-V based semiconductor QDs, the most typical InP QDs are a material that is the most widely studied because they show the similar emission range to II-VI based compound semiconductor QDs and have non-toxic characteristics. InP QDs have the broad emission range from visible to near-infrared range. However, compared with CdSe based QDs, InP QDs generally have lower emission efficiency and broader full width at half maximum (FWHM). By this reason, many studies have been made to fabricate InP QDs with improved emission efficiency.

The most common method used in fabricating InP QDs is to use dehalosilylation reaction between indium acetate $[In(OAc)_3]$ as an indium (In) precursor and tris(trimethylsilyl)phosphine $[P(TMS)_3]$ as a phosphorus (P) precursor. However, because $P(TMS)_3$ is highly toxic and inflammable, its use is significantly restricted. Additionally, the high price of $P(TMS)_3$ increases the manufacturing cost of QDs. To overcome these disadvantages, studies have been made to synthesize InP QDs using aminophosphine type phosphorus precursors such as tris(dimethylamino)phosphine $[P(DMA)_3]$ and tris(diethylamino)phosphine $[P(DEA)_3]$ as an alternative to $P(TMS)_3$.

However, it is observed that when InP QDs are fabricated using $P(DMA)_3$, the emission characteristics of the resulting product are not good. Accordingly, in the synthesis of InP QDs using $P(DMA)_3$, there is a need for solution to the problem. Additionally, the quantum yield and FWHM are still low and broad compared to II-VI based compound semiconductor QDs, so there is a need for improvements thereof.

DISCLOSURE

Technical Problem

The present disclosure is directed to providing a method for fabricating InP quantum dots with narrow full width at half maximum and high quantum yield using an aminophosphine type phosphorus precursor.

Technical Solution

To solve the above-described problem, a method for fabricating quantum dots according to the present disclosure includes (a) synthesizing InP cores based on an aminophosphine type phosphorus precursor, (b) size-sorting the InP cores, and (c) forming at least two shells on the size-sorted InP cores. In this instance, the size-sorting includes precipitating the InP cores with an addition of a dispersive solvent and a nondispersive solvent to the InP cores and separating the InP cores using a centrifugal separator, wherein the InP cores are separated in a descending order by size by performing iteration with a gradual increase in an amount of the nondispersive solvent.

Preferably, the size-sorting includes mixing the synthesized InP cores with the dispersive solvent, adding the nondispersive solvent until InP core precipitate is formed, and separating the precipitated InP cores using a centrifugal separator, separating subsequent precipitated InP cores using the centrifugal separator with an addition of the nondispersive solvent to the solution remaining after the separation of the precipitated InP cores, performing at least one iteration, and precipitating the remaining InP cores with an addition of the nondispersive solvent in excess to the solution remaining after the separation of the precipitated InP cores.

Preferably, synthesizing the InP cores includes mixing an indium (In) precursor with a solvent to prepare a mixed solution, increasing a temperature of the mixed solution to 100~140° C., adding a phosphorus precursor to the mixed solution of the increased temperature, and increasing the temperature of the mixed solution containing the added phosphorus precursor to 170~300° C. to maintain reaction and cooling down to room temperature, wherein the phosphorus precursor is $P(DMA)_3$ or $P(DEA)_3$.

The phosphorus precursor may be added when mixed with an organic solvent, a mixing mole ratio of the phosphorus precursor:the organic solvent may range between 1:1 and 1:100, and the organic solvent may be at least one of trioctylphosphine (TOP), tributylphosphine (TBP), triphenylphosphine (TPP), diphenylphosphine (DPP), oleylamine (OLA), dodecylamine (DDA), hexadecylamine (HDA), octadecylamine (ODA), octylamine, trioctylamine (TOA), oleic acid (OA) and 1-otadecene (ODE).

Forming the at least two shells may include forming each shell having a composition of cation-anion combination, the cation being selected from Zn, Mg and their combination and the anion being selected from S, Se and their combination, and the compositions of each shell may be different from each other.

The at least two shells may be a double-shell including an inner shell covering the core quantum dot and an outermost shell covering the inner shell, or a triple-shell including an inner shell covering the core quantum dot, an intermediate shell covering the inner shell and an outermost shell covering the intermediate shell, and the double-shell may be $Zn_xMg_{1-x}Se_yS_{1-y}/Zn_zMg_{1-z}S(0≤x≤1, 0≤y≤1, 0≤z≤1)$, and the triple-shell may be $ZnSe/Zn_xMg_{1-x}Se_yS_{1-y}/Zn_zMg_{1-z}S$ $(0≤x≤1, 0≤y≤1, 0≤z≤1)$ or $Zn_xMg_{1-x}Se_yS_{1-y}/Zn_zMg_{1-z}S/MgS(0≤x≤1, 0≤y≤1, 0≤z≤1)$.

The at least two shells may gradually increase in band gap from inner to outer. In an example, the at least two shells may be shell/shell such as ZnSeS/ZnS, ZnSeS/MgS, ZnSe/ZnS, ZnSe/MgS, MgSe/MgS or shell/shell/shell such as ZnSe/ZnS/MgS. In another example, the at least two shells may be ZnMgSe/ZnS, ZnMgSe/MgS, ZnMgS/ZnS, ZnMgSe/ZnS/MgS, ZnMgSeS/MgS, ZnMgSeS/ZnMgS/MgS.

Forming the at least two shells may include heating a first stock solution for a Zn source, adding a dispersion of the size-sorted cores and further heating, adding a second stock solution for Se and Zn sources and further heating to cause reaction to form a ZnSe inner shell, and adding a third stock solution for a S source to cause reaction, adding an additional S source and a Zn source to cause reaction and cooling down to room temperature to form a ZnS outermost shell.

In another example, forming the at least two shells may include heating a first stock solution for a Zn source, adding a dispersion of the size-sorted cores and further heating, adding a fourth stock solution for Se, S and Zn sources and further heating to cause reaction to form a ZnSeS inner shell, and adding a S source and a Zn source to cause reaction and cooling down to room temperature to form a ZnS outermost shell.

Advantageous Effects

The present disclosure proposes a method for fabricating aminophosphine type phosphorus precursor based InP quantum dots (QDs) with high quantum yield and narrowband emission characteristics by introduction of core size-sorting and various multishell processes.

According to the present disclosure, it is possible to reduce the full width at half maximum (FWHM) by making the core size uniform through core size-sorting. In particular, according to the present disclosure, it is possible to reduce the FWHM of InP QDs to 40 nm or less, in particular, 35~38 nm, based on the aminophosphine type phosphorus precursor.

According to the present disclosure, it is possible to further improve the quantum yield through various shell structures and process designs. Accordingly, it is possible to obtain aminophosphine type phosphorus precursor based InP QDs with narrowband emission and high quantum yield characteristics of 35~38 nm FWHM and 73~84% quantum yield.

MODE FOR DISCLOSURE

Hereinafter, the preferred embodiments of the present disclosure will be described in detail with reference to the accompanying drawings. However, the present disclosure is not intended to limit the disclosed embodiments and will be embodied in a variety of different forms, and rather, the disclosed embodiments make the present disclosure complete and are provided to help those skilled in the art to fully understand the scope of the present disclosure.

The present disclosure provides a method for fabricating aminophosphine type phosphorus precursor based InP quantum dots (QDs) with high quality emission characteristics. Particularly, the present disclosure introduces "size-sorting" after core synthesis. The size-sorting is a method that separates synthesized cores into large cores and small cores according to the mixing concentration using a dispersive solvent and a nondispersive solvent. The introduction of this process makes it possible to obtain highly uniform InP cores having narrowband emission characteristics. Additionally, it is possible to provide aminophosphine type phosphorus precursor based InP QDs having high quantum yield characteristics by applying various shell structures such as ZnSe/ZnS, $ZnSe_xS_{1-x}$/ZnS, and ZnSe/$ZnSe_xS_{1-x}$/ZnS and various processes.

Figure 1:
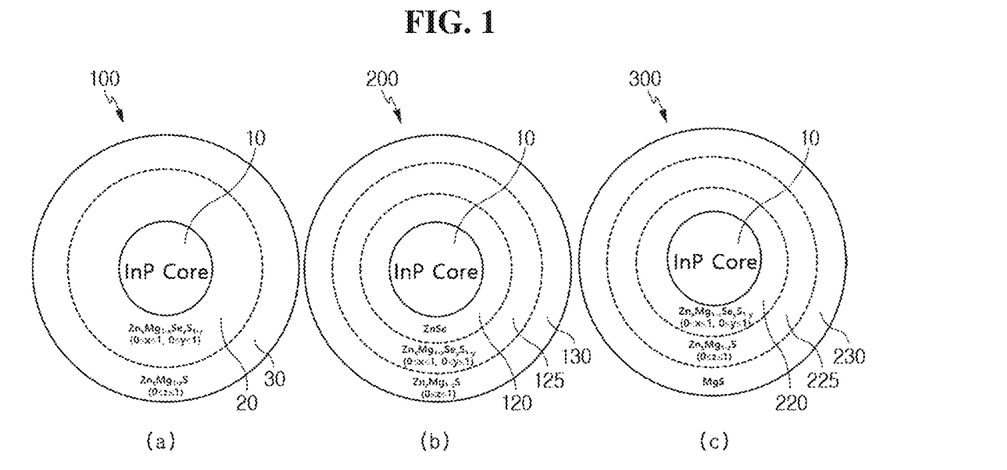
FIG. 1 is a schematic diagram of InP core/multishell quantum dots (QDs) according to the present disclosure.

FIG. 1 is a schematic diagram of InP core/multishell QDs according to the present disclosure.

The QD according to the present disclosure includes an aminophosphine type phosphorus precursor based InP core and at least two shells. The at least two shells may be a multishell such as a double-shell, a triple-shell or a quadruple-shell. In FIG. 1, (a) shows an example of a double-shell, (b) shows an example of a triple-shell, and (c) shows an example of another triple-shell.

First, a QD 100 shown in (a) of FIG. 1 includes an InP core 10, an inner shell 20 and an outermost shell 30. The inner shell 20 and the outermost shell 30 form a continuous shell. The inner shell 20/the outermost shell 30 may be $Zn_xMg_{1-x}Se_yS_{1-y}/Zn_zMg_{1-z}S(0≤x≤1, 0≤y≤1, 0≤z≤1)$, for example, ZnSeS/ZnS, ZnSeS/MgS, ZnSe/ZnS, ZnSe/MgS, MgSe/MgS, ZnMgSe/ZnS, ZnMgSe/MgS, ZnMgS/ZnS, ZnMgSeS/MgS.

Another QD 200 shown in (b) of FIG. 1 includes an InP core 10, an inner shell 120, an intermediate shell 125 and an outermost shell 130. The inner shell 120, the intermediate shell 125 and the outermost shell 130 form a continuous shell. The inner shell 120/the intermediate shell 125/the outermost shell 130 may be ZnSe/$Zn_xMg_{1-x}Se_yS_{1-y}$/$Zn_zMg_{1-z}S$ ($0 \leq x \leq 1$, $0 \leq y \leq 1$, $0 \leq z \leq 1$), for example, ZnSe/ZnS/MgS, ZnSe/ZnSeS/ZnS.

Still another QD 300 shown in (c) of FIG. 1 includes an InP core 10, an inner shell 220, an intermediate shell 225 and an outermost shell 230. The inner shell 220, the intermediate shell 225 and the outermost shell 230 form a continuous shell. The inner shell 220/the intermediate shell 225/the outermost shell 230 may be $Zn_xMg_{1-x}Se_yS_{1-y}$/$Zn_zMg_{1-z}S$/MgS ($0 \leq x \leq 1$, $0 \leq y \leq 1$, $0 \leq z \leq 1$), for example, ZnMgSe/ZnS/MgS, ZnMgSeS/ZnMgS/MgS.

The inner shell 20/the outermost shell 30 or the inner shell 120, 220/the intermediate shell 125, 225/the outermost shell 130, 230 covers around the InP core 10. In particular, the inner shell 20, 120, 220 covers the InP core 10 earliest. The outermost shell 30, 130, 230 is formed at the outermost side to form the surface of the QD 100, 200, 300. The intermediate shell 125, 225 covers the inner shell 120, 220, and the outermost shell 130, 230 covers the intermediate shell 125, 225. That is, the intermediate shell 125, 225 is interposed between the inner shell 120, 220 and the outermost shell 130, 230.

A lattice mismatch generates a defect that causes a non-radiative process. The inner shell 20, 120, 220 reduces the lattice mismatch between the InP core 10 and the outermost shell 30, 130, 230. The intermediate shell 125, 225 reduces the lattice mismatch between the inner shell 120, 220 and the outermost shell 130, 230. Accordingly, the inner shell 20/the outermost shell 30 or the inner shell 120, 220/the intermediate shell 125, 225/the outermost shell 130, 230 increases the quantum yield of the QD 100, 200, 300.

Figure 2:
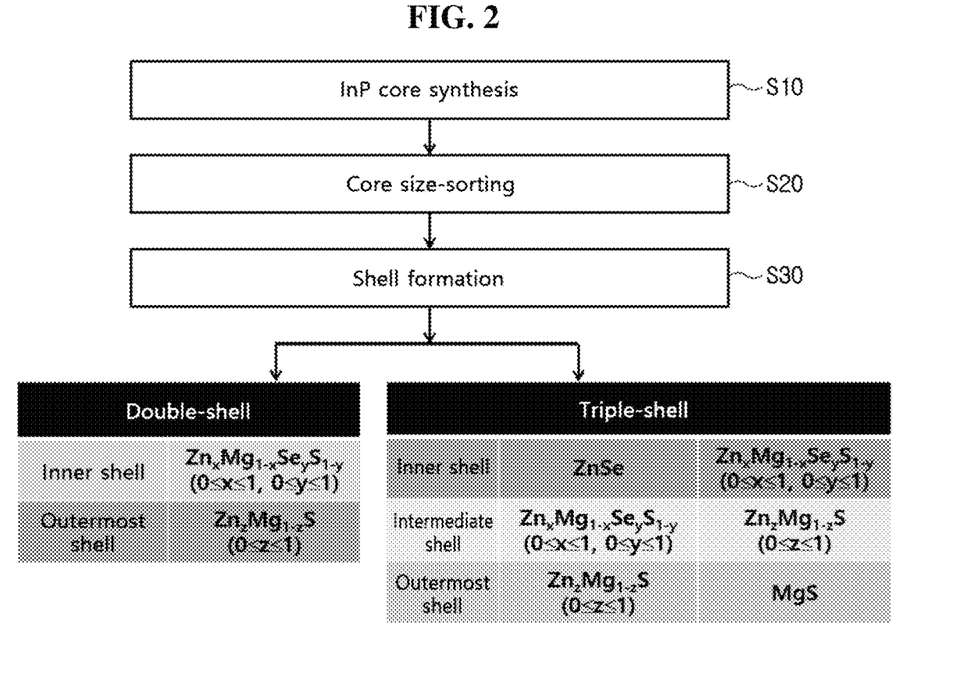
FIG. 2 is a flowchart of a method for fabricating InP core/multishell QDs according to the present disclosure.

FIG. 2 is a flowchart of a method for fabricating InP core/multishell QDs according to the present disclosure.

Referring to FIG. 2, the method for fabricating InP core/multishell QDs includes synthesizing an InP core (S10), size-sorting (S20) and forming at least two shells (S30).

First, InP core synthesis (S10) includes synthesizing an InP core based on an aminophosphine type phosphorus precursor.

S10 includes mixing an indium precursor with a solvent to form a mixed solution; increasing the temperature of the mixed solution to 100~140° C.; adding a phosphorus precursor to the mixed solution having the increased temperature; and increasing the temperature of the mixed solution containing the added phosphorus precursor to 170~300° C. to maintain a reaction and cooling down to room temperature, and the phosphorus precursor is $P(DMA)_3$ or $P(DEA)_3$. Through these steps, high uniformity and high quality InP cores may be formed.

Here, the indium precursor may be indium acetate, indium chloride, indium bromide ($InBr_3$), indium iodide ($InI_3$) or indium oxide.

The solvent is preferably an amine based synthetic solution. Its example may include DDA, HAD, ODA, OLA, octylamine and TOA. When the amine based synthetic solution is used for the solvent, the InP QDs may have a relatively uniform size distribution.

The mixed solution of the indium precursor and the solvent may further include a zinc (Zn) containing compound. The zinc containing compound is a zinc precursor. Thereby, InZnP cores are obtained. The zinc containing compound may be zinc acetate, zinc stearate ($Zn(St)_2$), zinc chloride ($ZnCl_2$), zinc bromide ($ZnBr_2$), zinc iodide ($ZnI_2$), zinc oxide, Zn oleate, Zn laurate, Zn palmitate and Zn myristate. InZnP core QDs are more uniform than InP core QDs. In the specification, InZnP core and InP core are collectively referred to as InP core.

The synthesis of the InP core begins with increasing the temperature of the mixed solution to 100~140° C. For example, the temperature of the mixed solution may be increased to about 120° C. Subsequently, the phosphorus precursor $P(DMA)_3$ or $P(DEA)_3$ is added fast (called hot injection). The temperature of the mixed solution containing the added phosphorus precursor is increased to 170~300° C. for a reaction. By the added $P(DMA)_3$ or $P(DEA)_3$, phosphorus is supplied, and the InP core is synthesized by reaction of the phosphorus with indium (or indium and zinc) present in the mixed solution. The reaction is followed by cooling down to room temperature.

The phosphorus precursor $P(DMA)_3$ or $P(DEA)_3$ may be added singly or in combination with an organic solvent such as trioctylphosphine (TOP). A mixing mole ratio of the phosphorus precursor:the organic solvent may range between 1:1 and 1:100. In addition to TOP, available organic solvents include TBP, TPP, DPP, OLA, DDA, HDA, ODA, octylamine, TOA, OA, ODE and their combination. When the phosphorus precursor should be added in a small amount, the organic solvent is used to dilute the phosphorus precursor.

Subsequently, size-sorting (S20) includes causing the precipitation of the InP cores synthesized in S10 with addition of a dispersive solvent and a nondispersive solvent, followed by separation through a centrifugal separator, and the cores are separated in a descending order by size, i.e., from larger to smaller, by repeatedly performing the size-sorting process with the gradually increasing amount of nondispersive solvent.

The size of the InP cores synthesized in S10 is relatively uniform, but because core generation and core growth occur concurrently in the mixed solution, the InP cores have a certain size distribution. However, according to the present disclosure, it is possible to individually sort the cores having similar sizes through size-sorting (S20).

When the dispersive solvent is added to the InP cores, then the nondispersive solvent is added, larger cores sink and are obtained, while smaller cores are dispersed and do not sink, due to a solubility difference resulting from the core size. The InP cores sink from larger ones. The precipitated InP cores are separated by performing a purification process on the solution containing the precipitated InP cores using a centrifugal separator to remove by-products. The addition of a small amount of nondispersive solvent to the remaining solution causes the precipitation of smaller InP cores that were not precipitated in the previous step. When this process iterates, the size of the precipitated InP cores gradually reduces with the gradually increasing amount of nondispersive solvent. The InP cores obtained after precipitation and separation in each step have similar sizes and a relatively very narrow size distribution, and by using the InP cores separated for each step, a narrow full width at half maximum (FWHM) may be obtained.

The dispersive solvent may be toluene, chloroform, n-hexane or ODE. The nondispersive solvent may be methanol, ethanol, isopropanol or acetone.

Preferably, after the InP cores synthesized in S10 is mixed with hexane, ethanol is added until the InP core precipitate is formed, and the precipitated InP cores are separated using a centrifugal separator. Ethanol is added to the solution remaining after separation of the precipitated InP cores, and the subsequent precipitated InP cores are separated using the centrifugal separator. This process iterates one or more times. Finally, the remaining InP cores are precipitated with an addition of ethanol in excess to the solution remaining after separation of the precipitated InP cores. With the increasing number of times ethanol is added and the centrifugal separator is used, cores that are gradually smaller in size are collected through each step.

Subsequently, at least two shells are formed on the size-sorted InP cores (S30). As described above, the present disclosure is characterized in that shelling is performed after reducing the core size distribution by size-sorting. This is not a process for continuous core-shell formation with an addition of shell-forming materials to a synthesized core solution. In the present disclosure, after core purification, cores are dispersed again, and then shells are formed, so it is said to be a 2-step method in which the core forming step and the shell forming step are separately performed.

Various defects may exist on the surface of the InP core, and such defects may act as non-radiative relaxation sites, causing quantum yield reduction. The present disclosure caps the surface defect of the InP core by forming at least two shells on the surface of the InP core, thereby achieving further improved quantum yield and narrow FWHM. Additionally, when the multishell is formed by the following method, it is possible to fabricate QDs with high efficiency by a simple method.

The step of forming at least two shells (S30) includes forming each shell having a composition of cation-anion combination, wherein the cation is selected from Zn, Mg and their combination and the anion is selected from S, Se and their combination, and the compositions of each shell may be different. Additionally, a double-shell or a triple-shell may be formed. The double-shell may be $Zn_xMg_{1-x}Se_yS_{1-y}/Zn_zMg_{1-z}S(0 \le x \le 1, 0 \le y \le 1, 0 \le z \le 1)$, and the triple-shell may be $ZnSe/Zn_xMg_{1-x}Se_yS_{1-y}/Zn_zMg_{1-z}S(0 \le x \le 1, 0 \le y \le 1, 0 \le z \le 1)$ or $Zn_xMg_{1-x}Se_yS_{1-y}/Zn_zMg_{1-z}S/MgS$ $(0 \le x \le 1, 0 \le y \le 1, 0 \le z \le 1)$.

The step of forming at least two shells (S30) includes mixing a dispersion of the size-sorted cores with a first compound (and an appropriate solvent) that is a source of the cation selected from Zn, Mg and their combination and a second compound (and an appropriate solvent) that is a source of the anion selected from S, Se and their combination, causing reaction, to form shells, wherein the first compound and/or the second compound are added in a divided manner over at least one step.

Hereinafter, the present disclosure will be described in more detail based on the description of experimental example of the present disclosure.

Fabrication of InP Core QDs

For InP core synthesis, 0.9 mmol of $InI_3$, 2.2 mmol of $ZnCl_2$ and 6 mL of OLA are put into a 50 mL 3-neck flask and the temperature is increased to 120° C. while shaking. Subsequently, degassing is performed for 1 hour using a vacuum pump. Additionally, nitrogen purging is performed and a mixed solution of 0.65 mL of TOP and 0.35 mL of $P(DMA)_3$ is added. Subsequently, after increasing the temperature to 180° C., reaction is maintained for 1~5 min, followed by cooling down to room temperature.

Core Size-Sorting Process

The synthesized InP cores are mixed with 5 mL of hexane, and ethanol is added until the core precipitate is formed. At this time, the precipitated cores are removed using a centrifugal separator and a small amount of ethanol is added to the remaining solution. Subsequently, the subsequent precipitated cores are removed using the centrifugal separator. This process iterates 1~4 times, and ethanol in excess is added to the remaining core solution to cause the precipitation of the remaining cores. Subsequently, a small amount of hexane is added to disperse the cores again, and ethanol in excess is added to precipitate the cores. The precipitated cores are dispersed in a small amount of toluene and stored in a nitrogen atmosphere.

ZnSe/ZnS Double-Shell Formation 2.2 mmol of zinc acetate, 3 mL of OLA and 3 mL of ODE are put into a 3-neck flask and heated to 120° C. while shaking, then degassing is performed for 1 hour using a vacuum pump. Subsequently, nitrogen purging is performed, and a dispersion of the size-sorted cores is added. Heating is performed to increase the temperature to 160° C., and a solution of 0.75 mmol of Se –1 mL of TOP and 0.8 mmol of zinc acetate –0.5 mL of OA and 2 mL of ODE is added. After increasing the reaction temperature to 270° C., reaction is maintained for 1 hour. Subsequently, a solution of Se 0.45 mmol-1 mL of TOP and 0.8 mmol of zinc acetate-0.5 mL of OA and 2 mL of ODE is added, and after increasing the temperature to 280° C., reaction is maintained for 1 hour. Subsequently, a solution of 0.3 mmol of Se –1 mL of TOP and 0.8 mmol of zinc acetate –0.5 mL of OA and 2 mL of ODE is added, and after increasing the temperature to 290° C., reaction is maintained for 1 hour to form a ZnSe inner shell. Additionally, to form a ZnS outermost shell, a solution of 4 mmol of sulfur (S) –2 mL of TOP and 0.8 mmol of zinc acetate –0.5 mL of OA and 2 mL of ODE is added, and after increasing the temperature to 300° C., reaction is maintained for 2 hours. Subsequently, 1 mL of 1-octanethiol (OTT) is added, and after reaction at 220° C. for 1 hour, a solution of 1 mmol of zinc acetate dehydrate $[(Zn(OAc)_2 \cdot 2H_2O)]$–1 mL of OA is added. Subsequently, reaction at 190° C. for 2 hours is followed by cooling down to room temperature. Finally, the final reaction solution is separated by centrifugal separation using hexane and ethanol and purified to obtain InP/ZnSe/ZnS QDs.

As described above, the multishell forming process may include heating a first stock solution for a Zn source, adding a dispersion of the size-sorted cores and further heating, adding a second stock solution for Se and Zn sources, and further heating to cause reaction to form a ZnSe inner shell. Additionally, adding the second stock solution and increasing the temperature may be performed in a divided manner many times for step-wise composition and temperature adjustment. Initially, the Se content is high and the temperature is low, and the Se content gradually reduces and the temperature gradually increases. Subsequently, the multishell forming process may include adding a third stock solution for a S source to cause reaction, adding additional S and Zn sources to cause reaction, and cooling down to room temperature, to form a ZnS outermost shell.

$ZnSe_xS_{1-x}/ZnS$ Double-Shell Process 2.2 mmol of zinc acetate, 3 mL of OLA and 3 mL of ODE are put into a 3-neck flask and heated to 120° C. while shaking, then degassing is performed for 1 hour using a vacuum pump. Subsequently, nitrogen purging is performed, and a dispersion of the size-sorted cores is added. Heating is performed to increase the temperature to 160° C., a solution of 0.6 mmol of Se –0.4 mmol of S –1 mL of TOP and 0.8 mmol of zinc acetate –0.5 mL of OA and 2 mL of ODE is added. After increasing the reaction temperature to 270° C., reaction is maintained for 1 hour. Subsequently, a solution of 0.45 mmol of Se –0.8 mmol of S –1 mL of TOP and 0.8 mmol of zinc acetate –0.5 mL of OA and 2 mL of ODE is added, and after increasing the temperature to 280° C., reaction is maintained for 1 hour. Subsequently, a solution of 0.3 mmol of Se –1.2 mmol of S –1 mL of TOP and 0.8 mmol of zinc acetate –0.5 mL of OA and 2 mL of ODE is added, and after increasing the temperature to 290° C., reaction is maintained for 1 hour. Additionally, a solution of 0.15 mmol of Se –1.6 mmol of S –1 mL of TOP and 0.8 mmol of zinc acetate –0.5 mL of OA and 2 mL of ODE is added, and after increasing the temperature to 300° C., reaction is maintained for 2 hours to form a $ZnSe_xS_{1-x}$ inner shell. Additionally, to form a ZnS outermost shell, 0.75 mL of OTT is added, and after reaction at 220° C. for 1 hour, a solution of 1 mmol of $Zn(OAc)_2.2H_2O$ –1 mL of OA is added. Subsequently, reaction at 190° C. for 2 hours is followed by cooling down to room temperature. Finally, the final reaction solution is separated by centrifugal separation using hexane and ethanol and purified to obtain $InP/ZnSe_xS_{1-x}/ZnS$ QDs.

As described above, the multishell forming process may include heating a first stock solution for a Zn source, adding a dispersion of the size-sorted cores and further heating, and adding a fourth stock solution for Se, S and Zn sources and further heating to cause reaction to form a ZnSeS inner shell. Additionally, adding the fourth stock solution and increasing the temperature may be performed in a divided manner many times for step-wise composition and temperature adjustment. Initially, the Se content is high, the S content is low and the temperature is low, and the Se content gradually reduces, the S content gradually increases and the temperature gradually increases. Subsequently, the multishell forming process may include adding a S source and a Zn source to cause reaction and cooling down to room temperature to form a ZnS outermost shell.

$ZnSe/ZnSe_xS_{1-x}/ZnS$ Triple-Shell Process 2.2 mmol of zinc acetate, 3 mL of OLA and 3 mL of ODE are put into a 3-neck flask and heated to 120° C. while shaking, then degassing is performed for 1 hour using a vacuum pump. Subsequently, nitrogen purging is performed, and a dispersion of the size-sorted cores is added. Heating is performed to increase the temperature to 160° C., and a solution of 0.6 mmol of Se –1 mL of TOP and 0.8 mmol of zinc acetate –0.5 mL of OA and 2 mL of ODE is added. After increasing the reaction temperature to 270° C., reaction is maintained for 1 hour. Subsequently, a solution of 0.45 mmol of Se –0.66 mmol of S –1 mL of TOP and 0.8 mmol of zinc acetate –0.5 mL of OA and 2 mL of ODE is added, and after increasing the temperature to 280° C., reaction is maintained for 1 hour. Subsequently, a solution of 0.3 mmol of Se –1.34 mmol of S –1 mL of TOP and 0.8 mmol of zinc acetate –0.5 mL of OA and 2 mL of ODE is added, and after increasing the temperature to 290° C., reaction is maintained for 1 hour. Additionally, a solution of 0.15 mmol of Se –2 mmol of S –1 mL of TOP and 0.8 mmol of zinc acetate –0.5 mL of OA and 2 mL of ODE is added, and after increasing the temperature to 300° C., reaction is maintained for 2 hours to form $ZnSe/ZnSe_xS_{1-x}$ inner shell/intermediate shell. To form a ZnS outermost shell, 0.75 mL of OTT is added, and after reaction at 220° C. for 1 hour, a solution of 1 mmol of $Zn(OAc)_2.2H_2O$ –1 mL of OA is added. Subsequently, reaction at 190° C. for 2 hours is followed by cooling down to room temperature. Finally, the final reaction solution is separated by centrifugal separation using hexane and ethanol and purified to obtain $InP/ZnSe/ZnSe_xS_{1-x}/ZnS$ QDs.

As described above, the multishell forming process may further include heating a first stock solution for a Zn source, adding a dispersion of the size-sorted cores and further heating, adding a second stock solution for Se and Zn sources, and further heating to cause reaction to form a ZnSe inner shell. Subsequently, the multishell forming process may include adding a fourth stock solution for Se, S and Zn sources and further heating to cause reaction to form a ZnSeS inner shell. Subsequently, the multishell forming process may further include adding a S source and a Zn source to cause reaction and cooling down to room temperature, to form a ZnS outermost shell.

As described above, the example of the present disclosure introduces a size-sorting process to "2-step" (hereinafter referred to as two-step, sorted core). For comparison, comparative example 1 (hereinafter referred to as one-pot) of continuous core-shell formation with an addition of shell-forming materials to a synthesized core solution, and comparative example 2 (hereinafter referred to as two-step, no sorted core) of 2-step with core purification and no size-sorting are prepared as well.

Evaluation:

UV-Vis absorption and PL spectra of QDs are recorded using absorption spectroscopy (Shimadzu, UV-2450) and 500 W xenon lamp-equipped spectrophotometer (PSI Inc., Darsa Pro-5200) respectively. The absolute PL quantum yield of the diluted dispersion of QDs is evaluated using a PL QY measurement system (C9920-02, Hamamatsu). The structure and alloy properties of QDs are analyzed using powder X-ray diffraction (XRD) (Rigaku, Ultima IV) using Cu Kα radiation. The actual chemical composition of QDs is analyzed using scanning electron microscope (SEM) and X-ray spectrometer (FE-SEM, 7610F-Plus, JEOL). To obtain a QD image, TEM operation is performed using JEOL JEM-F200 that operates at 200 kV.

Figure 3:
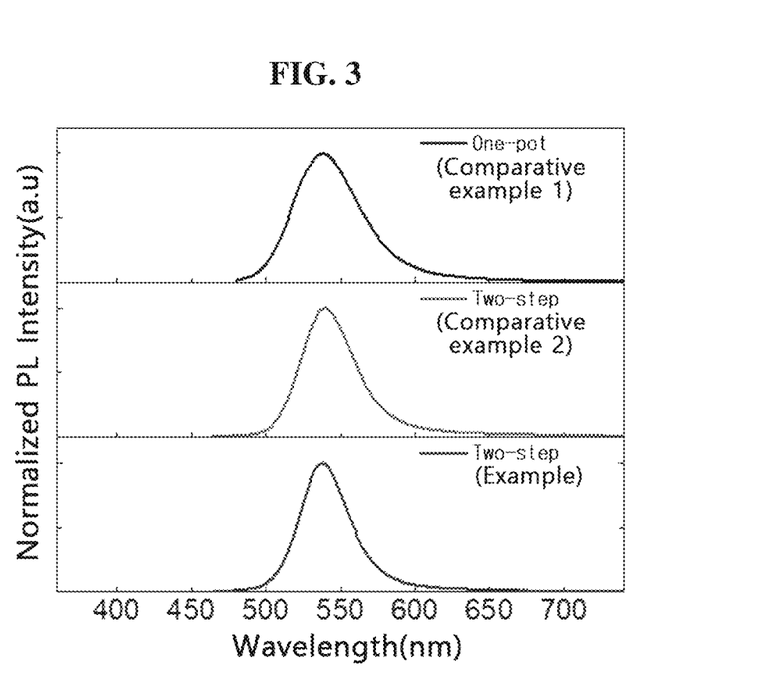
FIG. 3 shows PL spectrum changes of InP QDs in the presence or absence of InP core surface purification and size-sorting according to experimental example of the present disclosure.

Result:

FIG. 3 and Table 1 show PL spectrum and emission characteristics changes of $InP/ZnSe_xS_{1-x}/ZnS$ QDs in the presence or absence of surface purification and size-sorting of InP cores. In comparison of PL characteristics between "one-pot" (comparative example 1) involving continuous shelling without core surface purification and "two-step" (comparative example 2) involving purification and shelling, there is a FWHM reduction from 50 nm to 40 nm. In addition, it can be seen that by the introduction of size-sorting to 2-step (example) according to the present disclosure, FWHM of PL spectrum reduces from 40 nm to 37 nm, and the peak wave length (peak WL) is blue-shifted from 540 nm to 537 nm. Although both are 2-step, the example of the present disclosure with size-sorting shows an increase in quantum yield (PLQY) from 74% to 82%, creating a better outcome than comparative example 2 without size-sorting.

TABLE 1

|  | Peak WL (nm) | FWHM (nm) | PL QY (%) |
|---|---|---|---|
| Comparative example1/One-pot | 538 | 50 | 82 |
| Comparative example2/Two-pot (no sorted core) | 540 | 40 | 74 |
| Example/Two-pot (sorted core) | 537 | 37 | 82 |

Figure 4:
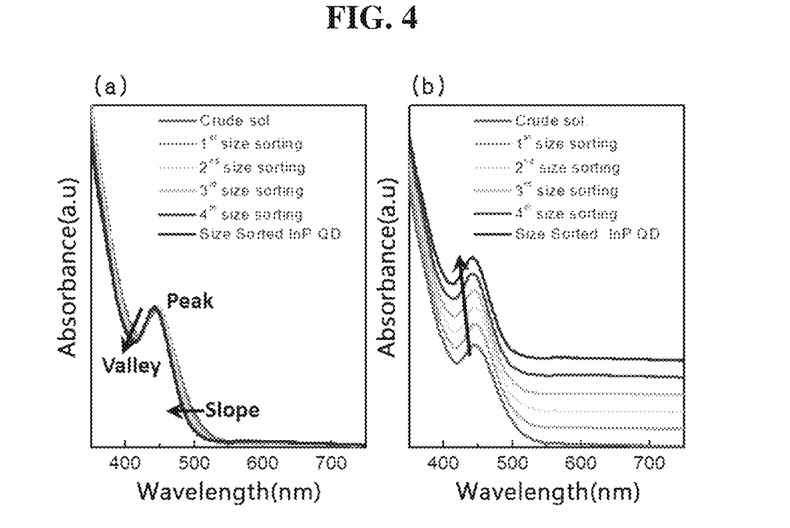
FIG. 4 shows UV absorption spectrum as a function of the number of times InP core size-sorting is performed according to experimental example of the present disclosure.

The blue-shift phenomenon can be seen through FIG. 4 showing UV absorption spectrum as a function of the number of times core size-sorting is performed. (a) of FIG. 4 shows absorption spectrum as a function of wavelength, and particularly, (b) is an enlarged view of peak in the absorption spectrum. It can be seen that as it goes from "Crude sol." with no size-sorting to $1^{st}$ size sorting and $2^{nd}$ size sorting, the absolute value of absorption spectrum slope at 450~500 nm gradually increases, and the peak is blue-shifted from 445 nm to 442 nm. This is a phenomenon occurring because the cores are sorted from larger ones according to the number of sorting.

The FWHM reduction effect of size-sorting is monitored, and amounts of Se and S in the $ZnSe_xS_{1-x}$ shell are adjusted. The Se content is 0.5, 1.0, 1.5 and 2.0 mmol, the S content is 5.0, 4.5, 4.0 and 3.5 mmol and the total anion content in the $ZnSe_xS_{1-x}$ shell is fixed to 5.5 mmol. In the above-mentioned combination of Se and S, the lowest Se content is called case I, and with the increasing Se content, QDs are called cases II, III and IV.

Figure 5:
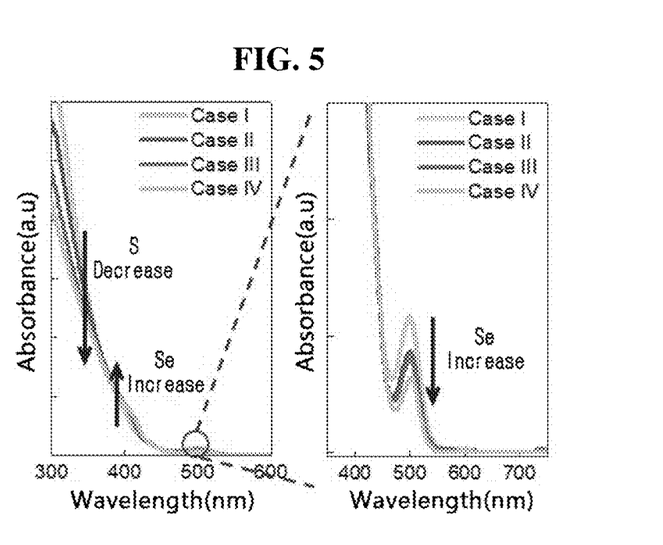
FIG. 5 shows UV absorption spectrum changes of InP core/$ZnSe_xS_{1-x}$/ZnS double-shell QDs as a function of an amount of Se—S according to experimental example of the present disclosure.

FIG. 5 shows changes in UV absorption spectrum as a function of the amount of Se—S. (a) of FIG. 5 shows absorption spectrum as a function of wavelength, and (b) is an enlarged diagram showing absorption spectrum, in particular, at 500 nm wavelength. As the Se content increases and the S content reduces from case I to case IV, absorbance in the wavelength range near ~420 nm tends to increase, and absorbance in the wavelength range near ~350 nm tends to reduce. This is a phenomenon that occurs because ZnSe and ZnS shelling ratios change due to the amount of Se and S in $ZnSe_xS_{1-x}$ shell. Additionally, Table 2 shows PL characteristics changes with the changes in the amount of Se and S.

TABLE 2

|  | Peak WL (nm) | FWHM (nm) | PL QY (%) |
| --- | --- | --- | --- |
| Case I (Se 0.5 mmol, S 5.0 mmol) | 525 | 42 | 83 |
| Case II (Se 1.0 mmol, S 4.5 mmol) | 527 | 37 | 84 |
| Case III (Se 1.5 mmol, S 4.0 mmol) | 527 | 36 | 84 |
| Case IV (Se 2.0 mmol, S 3.5 mmol) | 527 | 35 | 73 |

It is observed that as the Se content increases, namely, as it goes from case I to case IV, FWHM reduces from 42 nm to 35 nm, and although the quantum yield is on similar levels of 83~84% at 1.5 mmol (case III) or less of Se, the quantum yield sharply reduces to 73% at 2.0 mmol (case IV).

Figure 6:
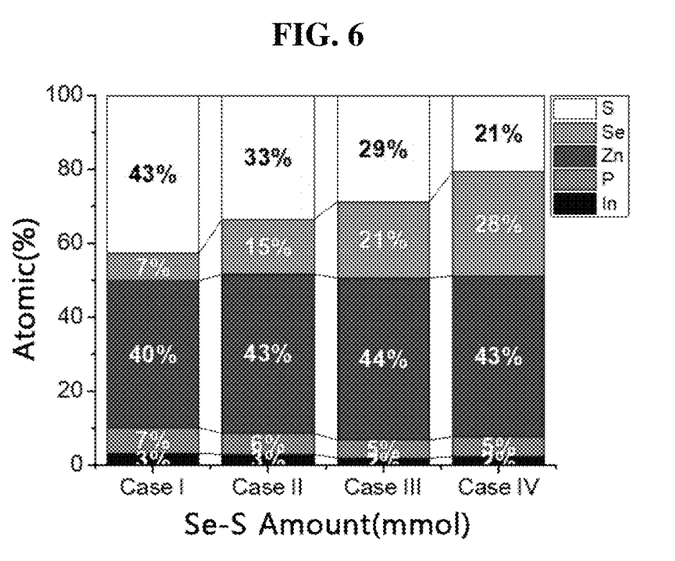
FIG. 6 is a FE-SEM/EDS composition analysis graph of InP core/$ZnSe_xS_{1-x}$/ZnS double-shell QDs as a function of an amount of Se—S according to experimental example of the present disclosure.

FIG. 6 is a graph showing the FE-SEM/EDS composition analysis results of cases I, II, III and IV. As a result of FE-SEM/EDS composition analysis, there is little change in atomic % of In, P and Zn in each case. However, it is observed that atomic % of Se changes from 7% to 28% as it goes from case I to case IV, and atomic % of S reduces 43% to 21% as it goes from case I to case IV.

Figure 7:
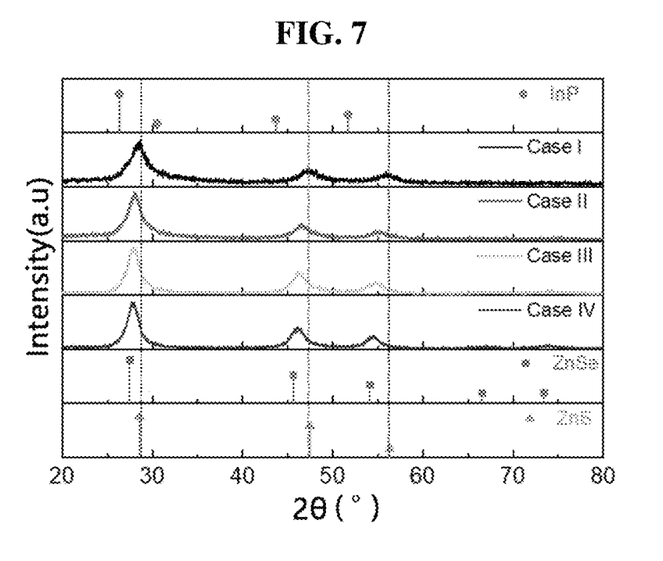
FIG. 7 shows XRD diffraction pattern changes of InP core/$ZnSe_xS_{1-x}$/ZnS double-shell QDs as a function of an amount of Se—S according to experimental example of the present disclosure.

Additionally, seeing the graph of FIG. 7 showing the XRD structure analysis results of each case, it is observed that as it goes from case I to case IV, XRD peak is shifted from ZnS phase to ZnSe phase. Through these results, it can be seen that ZnSe and ZnS shelling ratios can be intentionally adjusted by the amount of added Se—S.

Figure 8:
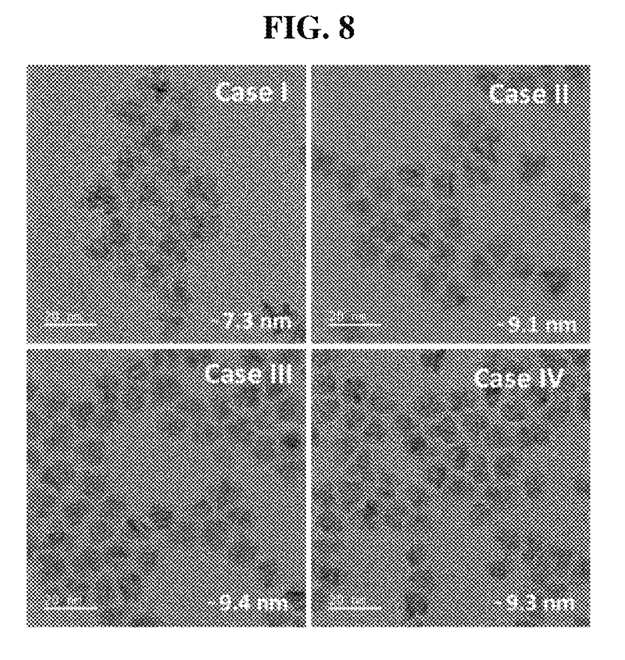
FIG. 8 is a TEM image of InP core/$ZnSe_xS_{1-x}$/ZnS double-shell QDs as a function of an amount of Se—S according to experimental example of the present disclosure.

Additionally, QD size is observed for each case through the TEM image analysis of FIG. 8. It can be seen that in the case of 0.5 mmol of Se (case I), the average size is as small as 7.3 nm, while in the case of 1.0 mmol or more of Se (case II), the average size is as large as 9.1~9.4 nm.

Additionally, it is observed that optical characteristics change with a change in shell structure from $ZnSe_xS_{1-x}$/ZnS to ZnSe/ZnS. Table 3 shows PL characteristics for each shell structure, and it can be seen that two shell structures show the same PL characteristics of 40 nm FWHM and 84% quantum yield.

TABLE 3

|  | Peak WL (nm) | FWHM (nm) | PL QY (%) |
| --- | --- | --- | --- |
| InP/$ZnSe_xS_{1-x}$/ZnS | 528 | 37 | 84 |
| InP/ZnSe/ZnS | 529 | 37 | 84 |

Figure 9:
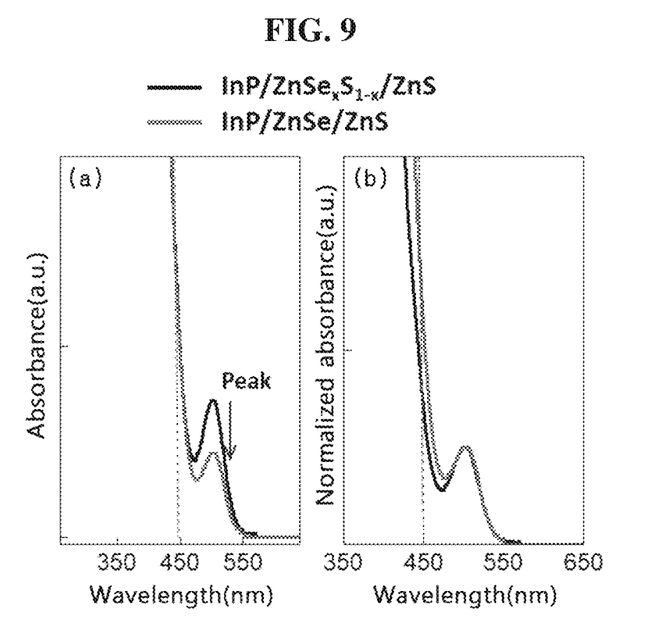
FIG. 9 shows UV absorption spectrum (a) at 450 nm and (b) at peak with shell structure changes according to experimental example of the present disclosure.

FIG. 9 shows changes in UV absorption spectrum according to the shell structure. FIG. 9(a) shows UV absorption spectrum measured at the same concentration on the basis of 450 nm, and it can be seen that QDs formed with ZnSe/ZnS shell structure reduces in absorbance at the peak wavelength, compared to QDs of $ZnSe_xS_{1-x}$/ZnS shell structure. Seeing FIG. 9(b) showing normalized absorbance at the peak wavelength, it can be seen that ZnSe/ZnS shell structure shows higher absorbance at 450 nm than $ZnSe_xS_{1-x}$/ZnS shell structure. As a result, it can be seen that QDs of InP/ZnSe/ZnS structure have no difference in PL characteristics but show relatively high blue light absorption characteristics.

In conclusion, the introduction of size-sorting and shell structure design to InP synthesis makes it possible to obtain the aminophosphine type phosphorus precursor based InP QDs with narrowband emission and high quantum yield characteristics of 35~38 nm FWHM and 73~84% quantum yield.

This work was financially supported by the National Research Foundation of Korea (NRF) grant funded by Ministry of Science, ICT & Future Planning (MSIP) (No. 2017R1A2B3008628, No. 2015M3D1A1069755), the Technology Innovation Program (20005011) funded by the Ministry of Trade, Industry & Energy (MOTIE, Korea), and the Korea Institute of Energy Technology Evaluation and Planning (KETEP) and the MOTIE (No. 20163030013980).

While the preferred embodiments of the present disclosure have been hereinabove shown and described, the present disclosure is not limited to a particular preferred embodiment, and it is obvious to those skilled in the art that many modifications can be made thereto without departing from the subject matter of the present disclosure set forth in the appended claims, and such modifications fall within the appended claims.

What is claimed is:

1. A method for fabricating quantum dots, comprising:
   (a) synthesizing InP cores based on an aminophosphine type phosphorus (P) precursor;
   (b) size-sorting the InP cores; and
   (c) dispersing the size-sorted InP cores in a solution and forming at least two shells on the InP cores,
   wherein the size-sorting comprises precipitating the InP cores with an addition of a dispersive solvent and a nondispersive solvent to the InP cores and separating the InP cores using a centrifugal separator, wherein the InP cores are separated in a descending order by size by performing iteration with a gradual increase in an amount of the nondispersive solvent,
   wherein forming the at least two shells comprises forming each shell having a composition of cation-anion combination, the cation being selected from Zn, Mg and their combination and the anion being selected from S, Se and their combination, and the compositions of each shell are different from each other, wherein the at least two shells are a double-shell including an inner shell covering the core quantum dot and an outermost shell covering the inner shell, or a triple-shell including an inner shell covering the core quantum dot, an intermediate shell covering the inner shell and an outermost shell covering the intermediate shell, and wherein the double-shell is $Zn_xMg_{1-x}Se_yS_{1-y}/Zn_zMg_{1-z}S$ ($0\leq x\leq 1$, $0\leq y\leq 1$, $0\leq z\leq 1$), and the triple-shell is $ZnSe/Zn_xMg_{1-x}Se_yS_{1-y}/Zn_zMg_{1-z}S$($0\leq x\leq 1$, $0\leq y\leq 1$, $0\leq z\leq 1$) or $Zn_xMg_{1-x}Se_yS_{1-y}/Zn_zMg_{1-z}S/MgS$($0\leq x\leq 1$, $0\leq y\leq 1$, $0\leq z\leq 1$).

2. The method for fabricating quantum dots according to claim 1, wherein the size-sorting comprises:
   mixing the synthesized InP cores with the dispersive solvent, adding the nondispersive solvent until InP core precipitate is formed, and separating the precipitated InP cores using a centrifugal separator;
   separating subsequent precipitated InP cores using the centrifugal separator with an addition of the nondispersive solvent to the solution remaining after the separation of the precipitated InP cores, and performing at least one iteration; and
   precipitating the remaining InP cores with an addition of the nondispersive solvent in excess to the solution remaining after the separation of the precipitated InP cores.

3. The method for fabricating quantum dots according to claim 1, wherein synthesizing the InP cores comprises:
   mixing an indium (In) precursor with a solvent to prepare a mixed solution;
   increasing a temperature of the mixed solution to 100~140° C.;
   adding a phosphorus precursor to the mixed solution of the increased temperature; and
   increasing the temperature of the mixed solution containing the added phosphorus precursor to 170~300° C. to maintain reaction and cooling down to room temperature,
   wherein the phosphorus precursor is tris(dimethylamino)phosphine [P(DMA)$_3$] or tris(diethylamino)phosphine [P(DEA)$_3$].

4. The method for fabricating quantum dots according to claim 3, wherein the phosphorus precursor is added when mixed with an organic solvent, a mixing mole ratio of the phosphorus precursor:the organic solvent ranges between 1:1 and 1:100, and the organic solvent is at least one of trioctylphosphine (TOP), tributylphosphine (TBP), triphenylphosphine (TPP), diphenylphosphine (DPP), oleylamine (OLA), dodecylamine (DDA), hexadecylamine (HDA), octadecylamine (ODA), octylamine, trioctylamine (TOA), oleic acid (OA) and 1-otadecene (ODE).

5. The method for fabricating quantum dots according to claim 1, wherein forming the at least two shells comprises:
   forming a $ZnSe_yS_{1-y}$($0\leq y\leq 1$) inner shell covering the core quantum dot;
   forming a ZnS outermost shell covering the $ZnSe_yS_{1-y}$ inner shell; and
   controlling absorbance of blue in a UV absorption spectrum by adjusting a ratio of Se and S in the $ZnSe_yS_{1-y}$ inner shell.

6. The method for fabricating quantum dots according to claim 1, wherein forming the at least two shells comprises:
   heating a first stock solution for a Zn source, adding a dispersion of the size-sorted cores and further heating;
   adding a second stock solution for Se and Zn sources and further heating to cause reaction to form a ZnSe inner shell; and
   adding a third stock solution for a S source to cause reaction, adding a S source and a Zn source to cause reaction and cooling down to room temperature to form a ZnS outermost shell.

7. The method for fabricating quantum dots according to claim 1, wherein forming the at least two shells comprises:
   heating a first stock solution for a Zn source, adding a dispersion of the size-sorted cores and further heating;
   adding a fourth stock solution for Se, S and Zn sources and further heating to cause reaction to form a ZnSeS inner shell; and
   adding a S source and a Zn source to cause reaction and cooling down to room temperature to form a ZnS outermost shell.

* * * * *